United States Patent
Dong et al.

(10) Patent No.: US 10,975,213 B2
(45) Date of Patent: Apr. 13, 2021

(54) COMPOSITION AND METHOD OF MAKING BIODEGRADABLE PELLETS

(71) Applicant: EcoPackers Inc., Toronto (CA)

(72) Inventors: Chang Dong, Markham (CA); Kritika Tyagi, Toronto (CA); Nuha Siddiqui, Toronto (CA)

(73) Assignee: Erthos Inc., Mississauga (CA)

( * ) Notice: Subject to any disclaimer, the term of this patent is extended or adjusted under 35 U.S.C. 154(b) by 35 days.

(21) Appl. No.: 16/394,034

(22) Filed: Apr. 25, 2019

(65) Prior Publication Data

US 2020/0048422 A1    Feb. 13, 2020

Related U.S. Application Data

(60) Provisional application No. 62/718,091, filed on Aug. 13, 2018.

(51) Int. Cl.
*C08L 3/02* (2006.01)
*C08J 9/00* (2006.01)

(52) U.S. Cl.
CPC ........... *C08J 9/0061* (2013.01); *C08J 9/0085* (2013.01); *C08L 3/02* (2013.01); *C08J 2201/03* (2013.01); *C08J 2303/02* (2013.01); *C08J 2429/04* (2013.01); *C08J 2491/00* (2013.01); *C08J 2497/02* (2013.01); *C08L 2201/06* (2013.01); *C08L 2203/14* (2013.01); *C08L 2205/035* (2013.01); *C08L 2205/06* (2013.01); *C08L 2205/16* (2013.01)

(58) Field of Classification Search
CPC .... C08L 3/02; C08L 2201/06; C08L 2205/06; C08L 29/04; C08L 2429/04; C08K 5/053; C08J 9/0061; C08J 2429/04; C08J 2303/02; C08J 2300/16; C08J 2491/00
See application file for complete search history.

(56) References Cited

U.S. PATENT DOCUMENTS

| | | |
|---|---|---|
| 5,288,318 A | 2/1994 | Mayer et al. |
| 5,393,804 A | 2/1995 | George et al. |
| 5,500,465 A | 3/1996 | Krishnann et al. |
| 6,013,116 A | 1/2000 | Major et al. |
| 6,730,724 B1 | 5/2004 | Bastioli et al. |
| 2006/0199881 A1 | 9/2006 | Xu |
| 2007/0020217 A1 | 1/2007 | Themens |
| 2008/0203606 A1 | 8/2008 | Xu |
| 2009/0311455 A1 | 12/2009 | Bastioli et al. |
| 2010/0003434 A1 | 1/2010 | Bastioli et al. |
| 2010/0297458 A1* | 11/2010 | Khemani .......... C08L 3/04 428/480 |
| 2017/0058109 A1* | 3/2017 | Nguyen ............ C08L 3/02 |
| 2017/0355179 A1* | 12/2017 | Sehanobish ........ B32B 27/08 |

FOREIGN PATENT DOCUMENTS

| | | |
|---|---|---|
| CA | 2142134 C | 11/1995 |
| CA | 2476799 C | 8/2003 |
| CA | 2582948 A1 | 4/2006 |
| WO | WO-2016-109196 A1 * | 7/2016 |

OTHER PUBLICATIONS

International Search Report from corresponding international application PCT/CA2019/051101.

* cited by examiner

*Primary Examiner* — Karuna P Reddy
(74) *Attorney, Agent, or Firm* — Stratford Managers Corporation

(57) ABSTRACT

Biodegradable pellet compositions comprising: a starch at about 30% to about 80% by weight of the composition, a plasticizer at about 2% to about 30% by weight of the composition; a flexibility agent at about 10% to about 40% by weight; a binder at about 3% to about 13% by weight of the composition; a hydrophobic agent at about 0.1% to about 5% by weight of the composition; and an emulsifier at about 0.1% to about 5% by weight of the composition. The compositions further comprise a defoaming agent where a biodegradable foam pellet is the end product. The compositions may optionally include a plant fiber.

15 Claims, 2 Drawing Sheets

COMPOSITION AND METHOD OF MAKING BIODEGRADABLE PELLETS

CROSS-REFERENCE TO RELATED APPLICATIONS

This application claims the benefit of the filing date of U.S. Provisional Application No. 62/718,091, filed Aug. 13, 2018, the contents of which are incorporated by reference.

TECHNICAL FIELD

The present disclosure relates to biodegradable material. In particular, it relates to biodegradable material used in the formation of environmentally-friendly products.

BACKGROUND

The majority of packaging materials that currently exist in the market is based on polystyrene, while plastic is used in the production of disposable products. The disposal of all of these materials is detrimental to the environment and has damaging effects on the health of humans and animals. For example, while biodegradable packaging does exist, very few options are available to companies to choose from. Furthermore, companies are discouraged from purchasing environmentally-friendly alternatives to common plastic products due to the high cost of these alternatives. In addition, there is a significant reduction in quality of current alternatives.

BRIEF SUMMARY

In one aspect, there is provided a biodegradable plastic pellet composition. The composition can comprise: a starch at about 30% to about 80% by weight of the composition, a plasticizer at about 2% to about 30% by weight of the composition; a flexibility agent at about 10% to about 40% by weight; a binder at about 3% to about 13% by weight of the composition; a hydrophobic agent at about 0.1% to about 5% by weight of the composition; and an emulsifier at about 0.1% to about 5% by weight of the composition.

In some embodiments, the starch may be a starch powder selected from the group consisting of corn starch, wheat starch, potato starch, buckwheat starch and any mixture thereof. In some embodiments, the starch powder can be unprocessed potato starch powder. Furthermore, the starch can have an amylose to amylopectin ratio of about 1:2 to about 1:5. In some embodiments, this ratio is about 1.4. In addition, the starch may have a moisture content of between about 15% to 25% by weight of the starch; or between about 18% to 22% by weight of the starch.

In some embodiments, the plasticizer can be selected from the group consisting of glycerol, ethylene glycol, polyglycerol and any mixture thereof. In some embodiments, the plasticizer is glycerol.

In some embodiments, the flexibility agent may be urea, citric acid or a polyol. The polyol may be selected from the group consisting of sorbitol, D-glucitol, mannitol, polyethylene glycol, polyvinyl alcohol and polyglycerol. In some embodiments, the flexibility agent can be urea or polyvinyl alcohol.

In some embodiments, the binder can be selected from the group consisting of stearic acid, glycerol monostearate, montmorillonite and any mixture thereof.

In some embodiments, the hydrophobic agent may be a fat or an oil, such that the fat or the oil can have an HLB in a range of about 9 to about 11.

In some embodiments, the emulsifier may be stearyl monglyceridyl citrate.

The composition may further comprise a plant fiber at about 0.01% to about 10% by weight of the composition. In some embodiments, the plant fiber may comprise at least one of abaca, hemp, bamboo, banana, coir, cotton, jute, kenaf, sisal, straw, remine, bagasse, sugar cane, wood and cellulose. In some embodiments, the plant fiber may comprise hemp shives or bamboo.

The composition may have a density between about 0.005 g/cm$^3$ to about 0.35 g/cm$^3$ at 25 C. Furthermore, the composition can have a melting point range of about 150 C to about 230 C.

In another aspect, there is provide a biodegradable plastic pellet composition comprising: potato starch at about 25% to about 40% by weight of the composition; a plasticizer at about 15% to about 35% by weight of the composition; a binder at about 5% to about 10% by weight of the composition; a flexibility agent at about 20% to about 40% by weight of the composition; a hydrophobic agent at about 0.1% to about 5% by weight of the composition, the hydrophobic agent having an HLB between about 9 and about 11; and an emulsifier at about 1% to about 5% by weight of the composition; wherein: the potato starch can have an amylose to amylopectin ratio of about 1:3 to about 1:5; and a moisture content of between about 15% and about 20% by weight of the starch.

In some embodiments, the plasticizer can be selected from the group consisting of glycerol, ethylene glycol, polyglycerol and any mixture thereof. In some embodiments, the plasticizer can be glycerol.

In some embodiments, the flexibility agent may be urea, citric acid, polyvinyl alcohol, mannitol or polyethylene glycol; or the flexibility agent may be urea or polyvinyl alcohol 1788.

In some embodiments, the hydrophobic agent is mineral oil, while the emulsifier can be stearyl monglyceridyl citrate.

In some embodiments, the binder may be selected from the group consisting of stearic acid, monostearin, nanometric montmorillonite and any mixture thereof.

The composition can further comprise a plant fiber at about 0.01% to about 5% by weight of the composition, wherein the plant fiber comprises hemp shives or bamboo.

Furthermore, the composition can have a melting point range of from about 190 C to about 230 C; and a density between about 0.01 g/cm$^3$ and about 0.025 g/cm$^3$.

In yet another aspect, there is provided a biodegradable plastic pellet composition. The composition can comprise potato starch at about 50% to about 80% by weight of the composition; a plasticizer at about 2% to about 15% by weight of the composition; a binder at about 5% to about 10% by weight of the composition; a flexibility agent at about 10% to about 30% by weight of the composition; a hydrophobic agent at about 0.1% to about 5% by weight of the composition, the hydrophobic agent having an HLB between about 9 and about 11; an emulsifier at about 0.1% to about 3% by weight of the composition; and a plant fiber at about 2% to about 12% by weight of the composition; wherein the potato starch can have an amylose to amylopectin ratio of about 1:3 to about 1:5; and a moisture content of between about 15% and about 20% by weight of the starch.

The plasticizer may be glycerol, polyglycerol or a mixture thereof. In some embodiments, the plasticizer is glycerol.

In some embodiments, the flexibility agent may be urea, citric acid, polyvinyl alcohol, mannitol or polyethylene glycol. In some embodiments, the flexibility agent may be urea or polyvinyl alcohol 1788.

In some embodiments, the hydrophobic agent may be mineral oil; while the emulsifier may be stearyl monglyceridyl citrate.

In some embodiments, the binder can be selected from the group consisting of stearic acid, monostearin, nanometric montmorillonite and any mixture thereof.

The composition may have a melting point range of from about 160 C to about 210 C. The composition may have a density between about 0.01 g/cm3 and about 0.025 g/cm3.

In some embodiments, the plant fiber may comprise at least one of abaca, hemp, bamboo, banana, coir, cotton, jute, kenaf, sisal, straw, remine, bagasse, sugar cane, wood and cellulose. In some embodiments, the plant fiber may comprise hemp shives or bamboo.

In another aspect, there is provided a biodegradable foam pellet composition. The composition can comprise: a starch at about 30% to about 80% by weight of the composition, a plasticizer at about 2% to about 30% by weight of the composition; a flexibility agent at about 5% to about 40% by weight; a binder at about 1% to about 15% by weight of the composition; a defoaming agent at about 0.1% to about 5% by weight of the composition; a hydrophobic agent at about 0.1% to about 5% by weight of the composition; and an emulsifier at about 0.1% to about 5% by weight of the composition.

In some embodiments, the starch powder can be unprocessed potato starch powder. Furthermore, the starch can have an amylose to amylopectin ratio of about 1:2 to about 1:5. In some embodiments, this ratio is about 1.4. In addition, the starch may have a moisture content of between about 15% to 25% by weight of the starch; or between about 18% to 22% by weight of the starch.

In some embodiments, the plasticizer can be selected from the group consisting of glycerol, ethylene glycol, polyglycerol and any mixture thereof. In some embodiments, the plasticizer is glycerol.

In some embodiments, the flexibility agent may be urea, citric acid or a polyol. The polyol may be selected from the group consisting of sorbitol, D-glucitol, mannitol, polyethylene glycol, polyvinyl alcohol and polyglycerol. In some embodiments, the flexibility agent can be urea or polyvinyl alcohol.

In some embodiments, the binder can be selected from the group consisting of stearic acid, glycerol monostearate, montmorillonite and any mixture thereof.

In some embodiments, the hydrophobic agent may be a fat or an oil, such that the fat or the oil can have an HLB in a range of about 9 to about 11.

In some embodiments, the emulsifier may be stearyl monglyceridyl citrate.

In some embodiments, the defoaming agent may be calcium carbonate.

The composition may further comprise a plant fiber at about 0.01% to about 10% by weight of the composition. In some embodiments, the plant fiber may comprise at least one of abaca, hemp, bamboo, banana, coir, cotton, jute, kenaf, sisal, straw, remine, bagasse, sugar cane, wood and cellulose. In some embodiments, the plant fiber may comprise hemp shives or bamboo.

The composition may have a density between about 0.005 g/cm$^3$ to about 0.35 g/cm$^3$ at 25 C. Furthermore, the composition can have a melting point range of about 130 C to about 180 C.

In another aspect, there is provided a biodegradable foam pellet composition. The composition may comprise potato starch at about 50% to about 80% by weight of the composition, a plasticizer at about 2% to about 10% by weight of the composition; a flexibility agent at about 5% to about 20% by weight; a binder at about 3% to about 20% by weight of the composition; a defoaming agent at about 0.1% to about 5% by weight of the composition; a hydrophobic agent at about 0.1% to about 5% by weight of the composition, the hydrophobic agent having an HLB between about 9 and about 11; and an emulsifier at about 0.1% to about 5% by weight of the composition; wherein the starch can have an amylose to amylopectin ratio of about 1:3 to about 1:5; and a moisture content of between about 15% and about 20% by weight of the starch.

The plasticizer can be glycerol, polyglycerol or a mixture thereof.

In some embodiments, the flexibility agent may be urea, citric acid, PVA 1788, mannitol or PEG.

In some embodiments, the hydrophobic agent can be mineral oil.

In some embodiments, the emulsifier can be stearyl monglyceridyl citrate.

In some embodiments, the binder may be selected from the group consisting of stearic acid, monostearin, nanometric montmorillonite and any mixture thereof.

In some embodiments, the defoaming agent can be calcium carbonate.

Furthermore, the composition can have a melting point range of from about 140 C to about 180 C; and a density between about 0.01 g/cm3 and about 0.025 g/cm3.

The composition may further comprise a plant fiber at a concentration of about 0.01% to about 5% by weight of the composition. In some embodiments, the plant fiber may comprise hemp shives or bamboo.

In yet another aspect, there is provided a method of making a biodegradable plastic pellet composition. The method can comprise the following steps: mixing a starch, a flexibility agent and a binder to produce a first mixture; adding a solution of a plasticizer, a hydrophobic agent and an emulsifier to the first mixture to produce a second mixture; sealing the second mixture at a sealing temperature for a sealing period to produce a third mixture; extruding the third mixture to produce an extrudate; and forming the extrudate into pellets. The biodegradable plastic pellet composition can comprise: the starch at about 30% to about 80% by weight of the composition, the plasticizer at about 2% to about 30% by weight of the composition; the flexibility agent at about 10% to about 40% by weight; the binder at about 3% to about 13% by weight of the composition; the hydrophobic agent at about 0.1% to about 5% by weight of the composition; and the emulsifier at about 0.1% to about 5% by weight of the composition.

In some embodiments, the sealing temperature is between about 20 C and about 30 C; or at about 25 C.

In some embodiments, the sealing period may be between about 20 hours and 50 hours; or between about 24 hours and 40 hours.

In some embodiments, extruding the third mixture can occur over a temperature range of from about 50 C to about 100 C; or from about 60 C to about 90 C.

The solution may further comprise plant fibers at about 0.01% to about 10% by weight of the composition.

In yet another aspect, there is provided a method of making a biodegradable foam pellet composition. The method may comprise mixing a starch, a flexibility agent and a binder to produce a first mixture; adding a solution of a plasticizer, a defoaming agent, a hydrophobic agent and an emulsifier to the first mixture to produce a second mixture; sealing the second mixture at a sealing temperature for a sealing period to produce a third mixture; extruding the third mixture to produce an extrudate; and forming the extrudate into pellets. The biodegradable plastic pellet composition may comprise the starch at about 30% to about 80% by weight of the composition, the plasticizer at about 2% to about 30% by weight of the composition; the flexibility agent at about 10% to about 40% by weight; the binder at about 3% to about 13% by weight of the composition; the defoaming agent at about 0.1% to about 5% by weight of the composition; the hydrophobic agent at about 0.1% to about 5% by weight of the composition; and the emulsifier at about 0.1% to about 5% by weight of the composition.

In some embodiments, the sealing temperature may be between about 20 C and about 30 C; or the sealing temperature is about 25 C.

In some embodiments, the sealing period may be between about 20 hours and 50 hours; or between about 20 hours and 30 hours.

In some embodiments, extruding the third mixture can occur over a temperature range of from about 50 C to about 170 C; or from about 60 C to about 150 C.

The solution may further comprise plant fibers at about 0.01% to about 10% by weight of the composition.

The present disclosure is related to biodegradable compositions, and methods for making the same. The biodegradable compositions can be in the form of pellets, which can be used in existing production lines (for example, where polystyrene- and polypropylene-based materials are used) to convert them into environmentally-friendly production lines for end products such as environmentally-friendly cutlery, hangers, casing, packaging edges, packaging sheets, packaging fillers and packaging molds. In addition, the biodegradable compositions may be used to prepare dense and solid-form plastics, or foam-based plastics.

In addition, the biodegradable compositions promote translocation of heavy metals in soil, thereby improving the of soil polluted by heavy metals. Agricultural by-products, such as raw, unmodified starch and unprocessed plant fibers may be used in the manufacture of the biodegradable compositions. Locally-sourced ingredients may be used, thereby allowing the end product to be cost-effective, while the plant fibers provide structure and durability.

Furthermore, the biodegradable compositions can be used in the production of end products that possess good resilience and compressibility properties in packaging applications; and good resistance and durability as traditional single-use plastic products such as various cutlery, straws, films, swift tags. In addition, the patentable end function of this material promotes the translocation of heavy metals in soil, while maintaining compatibility with existing plastic and polystyrene manufacturing machinery.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
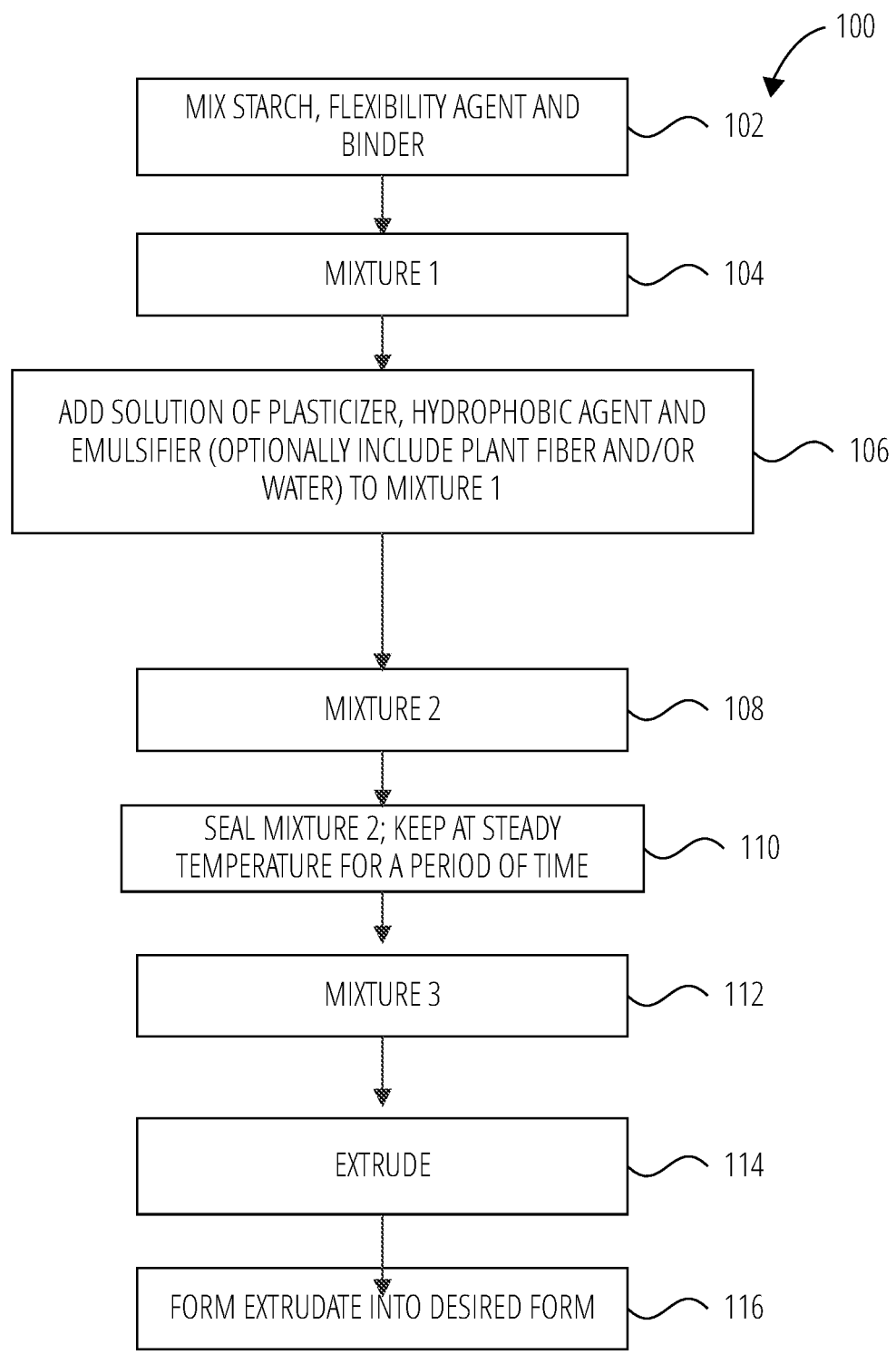
FIG. 1 illustrates a process for preparing biodegradable plastic pellets 100 in accordance with one embodiment.

The term "biodegradable" as used herein is generally known in the art as a material capable of being broken down especially into innocuous products by the action of living things (such as microorganisms).

Starch

Starch comprises from about 30% to about 80% by weight of each of the biodegradable plastic pellet composition and the biodegradable foam pellet composition. The starch may be a naturally occurring starch, a modified starch, or mixtures thereof.

Starches have a variety of moisture contents, which can be evaluated by techniques known in the art, such as, but not limited to, volumetric titration or near infrared photoacoustic spectroscopy. In some embodiments, the moisture content may be from 15% to 30% by weight of the starch; or from 18% to 25% by weight of the starch; or from 18% to 22% by weight of the starch. The starch may be in powder form.

In some embodiments, the starch used can be in a natural state (i.e. unprocessed), wherein the starch has not been modified by chemical or any other means. Naturally occurring starches comprise a starch selected from the group consisting of root starch, grain starch and any mixture thereof. Non-limiting examples of natural starches include potato starch, sweet potato starch, corn starch, bracken starch, wheat starch, cassava starch, sago palm starch, rice starch, tapioca starch, soybean starch, arrow root starch, lotus starch, buckwheat starch, high amylose corn starch, and commercial amylose powder, or mixtures thereof.

Since natural starch is derived from agricultural sources, it has an advantage of being abundant in supply, easy to replenish and low in price. In some embodiments, the natural starch comprises starch selected from the group comprising corn starch, wheat starch, potato starch, and mixtures thereof. In another embodiment, the natural starch comprises potato starch, which is often less costly than other natural starches such as tapioca. In addition, different sources can provide starch with different amylose to amylopectin ratios, which can impact the mechanical properties of the final biodegradable composition, such as tensile strength. In some embodiments, the potato starch may have an amylose to amylopectin ratio of from about 1:2 to about 1:5; or from about 1:3 to about 1:4. In an embodiment, the potato starch can be in powder form.

In some embodiments, natural starches are used rather than modified starches, since natural starches are less costly. Natural, unmodified starch generally has a very high average molecular weight and a broad molecular weight distribution.

In other embodiments, the starch used may be a modified starch. Non-limiting examples of modification include a change in the molecular weight of the starch, substitution of chemical moieties in the starch, and destructurization of the starch.

For example, the molecular weight can be modified using any number of techniques known in the art, such as, but not limited to acid or alkali hydrolysis, enzymatic reduction, acid reduction, oxidative reduction, physical/mechanical degradation (e.g. via thermomechanical energy input of the processing equipment), or any combination thereof. Such techniques may also reduce molecular weight distribution which may be advantageous since specific molecular ranges can provide beneficial mechanical properties to the final biodegradable product.

In addition, substitution of chemical moieties may be achieved using any number of techniques known in the art, such as, but not limited to etherification and esterification. For example, methyl, ethyl, or propyl (or larger aliphatic groups) can be substituted onto the starch using etherification and esterification techniques known in the art. Such substitution can be done when the starch is in its natural form or after it has been destructured.

Starches that have been partially or totally destructured in a separate process, can serve as starch pre-gels. In some embodiments, the starch may be destructured during processing to produce the biodegradable composition. Starch can be destructured in a variety of different ways, including, but not limited to subjecting a mixture of the starch and solvent to heat, which can be under pressurized conditions, and shear, to gelatinize the natural starch, leading to destructurization.

In some embodiments, at least about 50% of the starch can be destructured starch. Or at least about 80% of the starch can be destructured starch; or at least about 90% of the starch can be destructured starch. In some embodiments, about 100% of the starch may be destructured starch.

Plasticizer

The biodegradable composition comprises a plasticizer, which allows starch to flow and have molten properties that allow it to be processed like a conventional thermoplastic polymer. When used in the process of manufacturing the biodegradable composition, the plasticizer forms a generally homogeneous mixture with the components present in the composition when heated to a temperature above the softening and/or the melting temperature of the composition. The plasticizer may also improve the flexibility of the final products.

Plasticizers that are added to composition can include monomeric compounds and polymers. The polymeric plasticizers may have a molecular weight of about 100,000 g/mol or less. Polymeric plasticizers can include block copolymers and random copolymers, including terpolymers thereof. In certain embodiments, the plasticizer is a low molecular weight plasticizer. In some embodiments, the plasticizer can have a molecular weight of about 20,000 g/mol or less. In other embodiments, the plasticizer can have a molecular weight of about 5,000 g/mol or less. In yet other embodiments, the plasticizer can have a molecular weight of about 1,000 g/mol or less.

In some embodiments, the plasticizer may be selected from the group comprising monomeric compounds and polymers, organic compounds having at least one hydroxyl group, hydroxyl polymeric plasticizers, hydrogen bonding organic compounds, aliphatic acids and mixtures thereof.

The plasticizer can be, for example, an organic compound having at least one hydroxyl group, including polyols having two or more hydroxyls. Hydroxyl plasticizers can be selected from the group comprising sugars such as glucose, sucrose, fructose, raffinose, maltodextrose, galactose, xylose, maltose, lactose, mannose erythrose, and pentaerythritol; sugar alcohols such as erythritol, xylitol, malitol, mannitol and sorbitol; polyols such as glycerol (glycerin), ethylene glycol, propylene glycol, dipropylene glycol, butylene glycol, hexane triol, and the like, and polymers thereof; and mixtures thereof. In some embodiments, the hydroxyl plasticizers are selected from the group comprising glycerol, mannitol, sorbitol, and mixtures thereof.

Other examples of plasticizers include hydroxyl polymeric plasticizers which can be selected from the group comprising poloxamers (polyoxyethylene/polyoxypropylene block copolymers), poloxamines (polyoxyethylene/polyoxypropylene block copolymers of ethylene diamine) and mixtures thereof.

Also suitable for use herein as plasticizers are hydrogen bonding organic compounds, including those which do not have a hydroxyl group. Non-limiting examples of hydrogen bonding organic compounds include urea and urea derivatives; anhydrides of sugar alcohols such as sorbitol; animal proteins such as gelatin; vegetable proteins such as sunflower protein, soybean proteins, cotton seed proteins; and mixtures thereof. In another embodiment, plasticizers can be selected from the group comprising phthalate esters, dimethyl and diethyl succinate and related esters, glycerol triacetate, glycerol mono and diacetates, glycerol mono, di, and tripropionates, butanoates, stearates, lactic acid esters, citric acid esters, adipic acid esters, stearic acid esters, oleic acid esters, and other fatty acid esters which are biodegradable, and mixtures thereof. In yet another embodiment, the plasticizer is an aliphatic acid selected from the group comprising ethylene acrylic acid, ethylene maleic acid, butadiene acrylic acid, butadiene maleic acid, propylene acrylic acid, propylene maleic acid, and other hydrocarbon based acids and mixtures thereof.

In some embodiments, the plasticizer is selected from the group comprising glycerol, ethylene glycol, sorbitol, polyglycerol or mixtures thereof. In some embodiments, the plasticizer is glycerol. The glycerol can have water content; for example, glycerol at a technical grade of up to 95% can be used. While not bound by any particular theory, it is thought that glycerol partially reacts with the hydroxyl groups of the polysaccharide chains in the starch. In some embodiments, polyglycerol can be used to strengthen the mechanical properties of the biodegradable composition through cross-linking of the hydroxyl groups.

Flexibility Agent

The biodegradable composition comprises a flexibility agent, which allows the polymeric starch molecules to have flexibility and flow during processing, for example to form the pellets. Flexibility agents known in the art may be used, such as small molecules and/or long-chain polymers. Non-limiting examples of small molecules include urea and citric acid; non-limiting examples of long-chain polymers included polyols, such as (but not limited to) D-glucitol, mannitol, polyethylene glycol, polyvinyl alcohol and polyglycerol.

Defoaming Agent

The biodegradable foam pellet composition comprises one or more defoaming agents. Suitable defoaming agents include, for example, aliphatic acids or esters; alcohols; sulfates or sulfonates; amines or amides; vegetable oils, waxes; mineral oils as well as their sulfated derivatives; fatty acid soaps such as alkali, alkaline earth metal soaps; and mixtures thereof. An example of a suitable defoaming agent includes calcium carbonate ($CaCO_3$).

Additives

The composition may contain one or more of the following additives that are well known in the plastics industry. These include additives that function as binders by complexing with the starch and flexibility agent. Non-limiting examples of binders included soy proteins, whey proteins, and glutens, distilled monoglycerides (e.g. glycerol monostearate and glycerol monopalmitate), polymers (e.g. ethylene-acrylic acid), stearic acid and its esters and/or salts, phyllosilicate minerals, and mixtures thereof. In some embodiments, the binder can be stearic acid, glycerol monostearate, montmorillonite, or any mixture thereof.

Other known additives include hydrophobic agents that enhance the water-resistance of end products, along with emulsifiers used to help with the mixing of the hydrophobic agents in the composition. Non-limiting examples of hydrophobic agents include fats and oils having a Hydrophile-Lipophile Balance (HLB) of between about 9 and about 11.

The composition can optionally include plant fibers, depending on the end product of the plastic pellets. For example, plant fibers can be used where the end product is a non-transparent plastic and/or a hard plastic. Plant fibers are used to provide strength for the end product. Non-limiting examples of plant fibers include abaca, hemp, bamboo, banana, coir, cotton, jute, kenaf, sisal, straw, remine, bagasse, sugar cane, wood and cellulose. The plant fiber can be in the form of powder, dust, or shives. In some embodiments, hemp shives/dust or bamboo are used.

Water may be added in the process of making the biodegradable pellet compositions.

FIG. 1 illustrates a process 100 for preparing biodegradable plastic pellets in accordance with one embodiment.

At step 102, the starch, flexibility agent and binder are mixed to homogeneity using methods known in the art. For example, mixing at step 102 can take place at high speed, to obtain Mixture 1 104.

At step 106, a solution comprising a plasticizer, hydrophobic agent and an emulsifier is added to Mixture 1. Water may be added at this stage, while the plasticizer may include water content. If plant fiber is needed for an end product of the biodegradable pellets, then it can be added to the solution at step 106. The combination of Mixture 1 and the solution is mixed to provide mixture 2 at step 108. Mixture 2 is then sealed for a period of time at a steady temperature at step 110. In some embodiments, Mixture 2 is sealed for a period of 24-48 hours at ambient temperature (e.g. from about 22 C to about 26 C). After sealing and maintaining at a steady temperature over a period of time, Mixture 3 is obtained at step 112.

Mixture 3 is extruded at step 114 using extrusion processes known in the art. In some embodiments, Mixture 3 is extruded over a temperature range of 50 C-100 C, using a die size of from 2 mm to 4 mm. The resulting extrudate can then be formed into a desired shape/size at step 116. In some embodiments, the extrudate is cut into pellets; the pellets can be about 2 mm-4 mm in diameter and about 0.5 cm in length.

The biodegradable plastic pellets can be used in existing manufacturing processes to produce biodegradable plastic products.

In some embodiments, injection molding or extrusion is used to process the biodegradable plastic pellets into biodegradable plastic products, examples of which include cutlery, plastic film, plastic bags, plastic bottles, hangers, drinking cups, etc.

Figure 2:
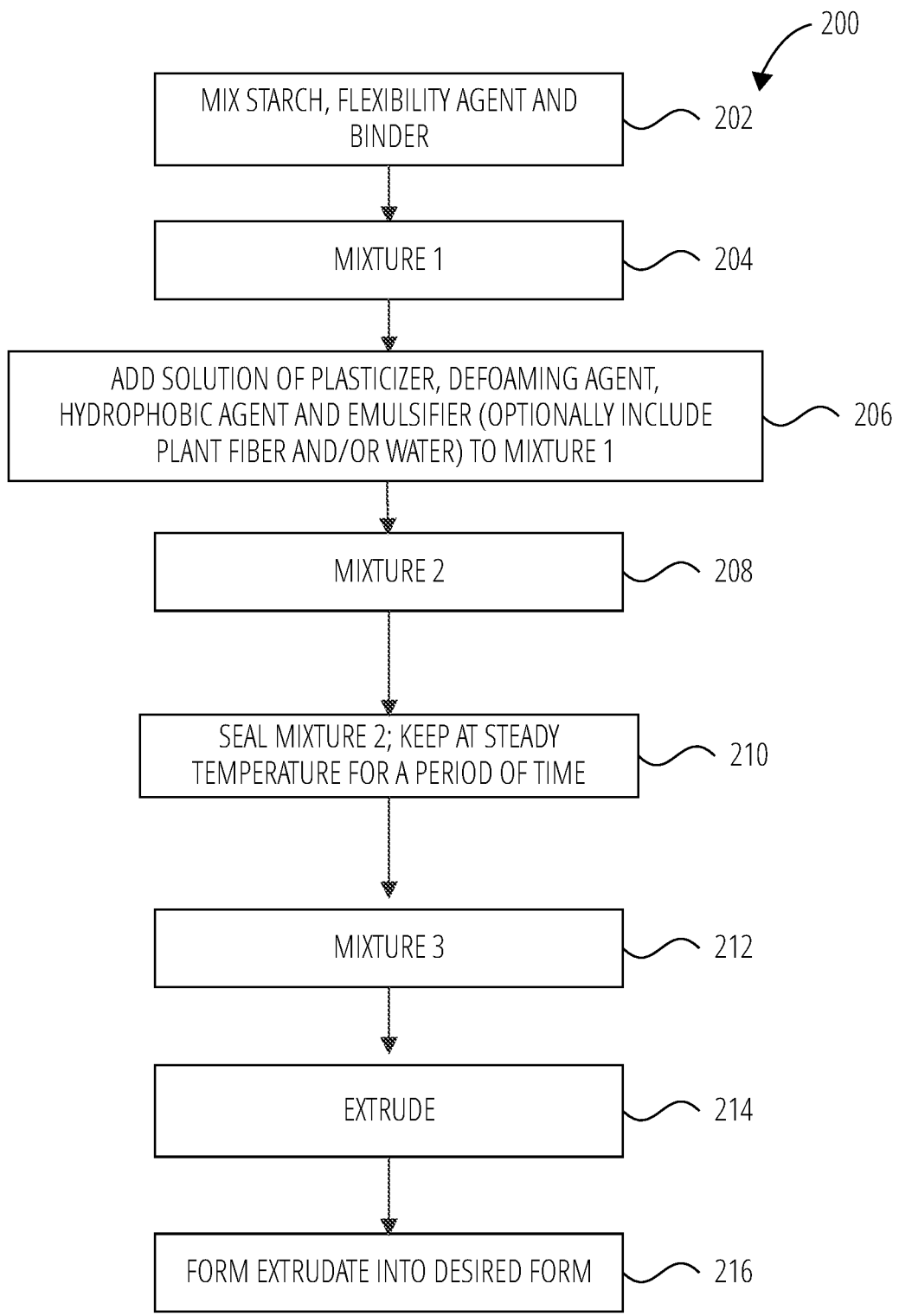
FIG. 2 illustrates a process for preparing biodegradable foam pellets 200 in accordance with one embodiment.

FIG. 2 illustrates a process 200 for preparing biodegradable foam pellets in accordance with one embodiment.

At step 202, the starch, flexibility agent and binder are mixed to homogeneity using methods known in the art. For example, mixing at step 202 can take place at high speed, to obtain Mixture 1 204.

At step 206, a solution comprising a plasticizer, a defoaming agent, a hydrophobic agent and an emulsifier is added to Mixture 1. Water may be added at this stage, while the plasticizer may include water content. If plant fiber is needed for the end product of the biodegradable pellets, then it can be added to the solution at step 206. The combination of the solution and Mixture 1 is mixed to provide mixture 2 at step 208. Mixture 2 is then sealed for a period of time at a steady temperature at step 210. In some embodiments, Mixture 2 is sealed for a period of 24-48 hours at ambient temperature (e.g. from about 22 C to about 26 C). After sealing and maintaining at a steady temperature over a period of time, Mixture 3 is obtained at step 212.

Mixture 3 is extruded at step 214 using extrusion processes known in the art. Before extruding Mixture 3, an introducing material is usually put through the extruder. The introducing material may comprise potato starch and water, with the weight percentage of water at about 18% based on the weight of potato starch. In some embodiments, Mixture 3 is extruded over a temperature range of 30 C-180 C, using a die size of from 2 mm to 4 mm. The resulting extrudate is then formed into the desired form/size at step 216. In some embodiments, the extrudate is cut into pellets. Furthermore, the pellets can be 2 mm-4 mm in diameter and about 0.5 cm in length.

The biodegradable foam pellets can be used to existing manufacturing processes to produce biodegradable foam products.

In some embodiments, extrusion is used to process the biodegradable foam pellets into biodegradable foam products, examples of which include packaging material, sheets, packaging peanuts, insulation, etc.

EXAMPLES

Tables 1-5 provide examples of biodegradable pellet compositions, while Table 6 provides the sealing temperature, sealing period, and melting point range of each of examples 1-5. Tables 1-2, in particular, each provide an embodiment of a biodegradable foam pellet, while Tables 3-5 each provide an embodiment of a biodegradable plastic pellet.

The examples of biodegradable plastic pellets have variation in their composition so as to design the plastic pellet for a particular type of end plastic product. That is, Table 3 provides an example for a biodegradable plastic pellet that will be used to form hard plastic products; Table 4 provides an example for a biodegradable plastic pellet that will be used to form plastic products with medium hardness; and Table 5 provides an example for a biodegradable plastic pellet that will be used to form soft plastic products.

Each example was extruded to provide pellets as shown in FIGS. 1 and 2.

It is seen from Table 6 that all compositions were sealed at 25 C; examples 1-4 were sealed for 24 hours, while example 5 was sealed for 36 hours. The melting point range of each example is also shown.

TABLE 1

Example 1: Biodegradable foam pellets

| Category | Item | weight | wt % |
|---|---|---|---|
| Starch | Potato starch (unprocessed) | 1600 | 68.30% |
| Flexibility agent | PVA 1788 | 400 | 17.08% |
| Plant Fiber | Hemp shives | 1.6 | 0.07% |
| Binder | Montmorillonite | 200 | 8.54% |
| Binder | Monostearin | 6 | 0.26% |
| Binder | Stearic Acid | 20 | 0.85% |
| Defoaming agent | CaCO3 | 20 | 0.85% |
| Plasticizer | Glycerol | 80 | 3.42% |
| Emulsifier | Stearyl monoglyceridyl citrate | 9 | 0.38% |
| Hydrophobic agent | Mineral Oil | 6 | 0.26% |

TABLE 2

Example 2: Biodegradable foam pellets

| Category | Item | weight | wt % |
|---|---|---|---|
| Starch | Potato starch (unprocessed) | 1800 | 76.48% |
| Flexibility agent | PVA 1788 | 200 | 8.50% |
| Plant Fiber | Hemp shives | 1.6 | 0.07% |
| Binder | Montmorillonite | 200 | 8.50% |
| Binder | Monostearin | 6 | 0.25% |
| Binder | Stearic Acid | 20 | 0.85% |
| Defoaming agent | CaCO3 | 20 | 0.85% |
| Plasticizer | Glycerol | 90 | 3.82% |
| Emulsifier | Stearyl monoglyceridyl citrate | 10 | 0.42% |
| Hydrophobic agent | Mineral Oil | 6 | 0.25% |

TABLE 3

Example 3: Biodegradable plastic pellets for hard plastic

| Category | Item | weight | wt % |
|---|---|---|---|
| Starch | Potato starch (unprocessed) | 1500 | 59.50% |
| Flexibility agent | PVA 1788 | 500 | 19.83% |
| Plant Fiber | Hemp shives | 200 | 7.93% |
| Binder | Montmorillonite | 200 | 7.93% |
| Binder | Monostearin | 6 | 0.24% |
| Binder | Stearic Acid | 20 | 0.79% |
| Plasticizer | Glycerol | 80 | 3.17% |
| Emulsifier | Stearyl monoglyceridyl citrate | 9 | 0.36% |
| Hydrophobic agent | Mineral Oil | 6 | 0.24% |

TABLE 4

Example 4: Biodegradable plastic pellets for medium plastic

| Category | Item | weight | wt % |
|---|---|---|---|
| Starch | Potato starch (unprocessed) | 1500 | 57.72% |
| Flexibility agent | PVA 1788 | 500 | 19.24% |
| Plant Fiber | Hemp shives | 200 | 7.70% |
| Binder | Montmorillonite | 200 | 7.70% |
| Binder | Monostearin | 6 | 0.23% |
| Binder | Stearic Acid | 20 | 0.77% |
| Plasticizer | Glycerol | 150 | 5.77% |
| Emulsifier | Stearyl monoglyceridyl citrate | 16.7 | 0.64% |
| Hydrophobic agent | Mineral Oil | 6 | 0.23% |

TABLE 5

Example 5: Biodegradable plastic pellets for soft plastic

| Category | Item | weight | wt % |
|---|---|---|---|
| Starch | Potato starch (unprocessed) | 1000 | 32.97% |
| Flexibility agent | PVA 1788 | 1000 | 32.97% |
| Plant Fiber | Hemp shives | 1 | 0.03% |
| Binder | Montmorillonite | 200 | 6.59% |
| Binder | Monostearin | 6 | 0.20% |
| Binder | Stearic Acid | 20 | 0.66% |
| Plasticizer | Glycerol | 720 | 23.74% |
| Emulsifier | Stearyl monoglyceridyl citrate | 80 | 2.64% |
| Hydrophobic agent | Mineral Oil | 6 | 0.20% |

TABLE 6

| Example | Processing Temp (C.) | Processing Time (hours) | MP Range (C) |
|---|---|---|---|
| 1 | 25 | 24 | 150-156 |
| 2 | 25 | 24 | 158-165 |
| 3 | 25 | 24 | 176-183 |
| 4 | 25 | 24 | 192-196 |
| 5 | 25 | 36 | 210-218 |

Examples 1-2 (Biodegradable Foam Pellets)

The biodegradable foam pellet examples shown in Tables 1-2 were prepared according to the procedure shown in FIG. 2, with the specific processing temperature and processing time of each example shown in Table 6. The moisture content of the potato starch in each sample was determined by using a Karl Fischer Moisture Titrator. Following the passing of an introduction material through the extruder (as described above), Mixture 3 (of each example 1 and 2) was fed into a Twins Extruder (70 mm in diameter; 1510 mm in length). The extruder has three main temperature zones. Zone 1 is nearest the feeder, while Zone 3 is the farthest. The temperature settings were: Zone 1 at 60 C; Zone 2 at 110 C; and Zone 3 at 150 C. The processing parameters were as follows: feeding rate: 80 kg/h; and rounds per minute: 300 rpm. Where foam packaging peanuts were produced, the pressure of producing the peanuts was about 45-50 Mpa.

Examples 3-5 (Biodegradable Plastic Pellets)

Similarly, examples shown in Tables 3-5 were initially prepared according to the procedure shown in FIG. 1. with the specific processing temperature and processing time of each example shown in Table 6. The moisture content of the potato starch in each sample was determined by using a Karl Fischer Moisture Titrator. Mixture 3 (of each example 3, 4 and 5) was fed into a Twins Extruder (70 mm in diameter; 1510 mm in length), following the preparation of the Twins Extruder with a potato starch/water mixture, as described previously. The temperature settings were: Zone 1 at 60° C.; Zone 2 at 75° C.; and Zone 3 at 90° C. The processing parameters were as follows: feeding rate: 80 kg/h; and rounds per minute: 15-20 rounds per minute. The extrudate was made into pellets by cutters into size of 0.5 cm in length and 2-4 mm in diameters.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A biodegradable plastic pellet composition, the composition consisting of:
   a starch at about 30% to about 80% by weight of the composition;
   a plasticizer at about 2% to about 30% by weight of the composition;
   a flexibility agent at about 10% to about 40% by weight of the composition;
   a binder at about 3% to about 13% by weight of the composition;
   a hydrophobic agent at about 0.1% to about 5% by weight of the composition, wherein the hydrophobic agent is a fat or an oil, the fat or the oil having an HLB in a range of about 9 to about 11;
   an emulsifier at about 0.1% to about 5% by weight of the composition; and
   optionally, a plant fiber at about 0.01% to about 10% by weight of the composition.

2. The composition of claim 1, wherein the starch is a starch powder selected from the group consisting of corn starch, wheat starch, potato starch, buckwheat starch and any mixture thereof.

3. The composition of claim 1, wherein the plasticizer is selected from the group consisting of glycerol, ethylene glycol, polyglycerol and any mixture thereof.

4. The composition of claim 1, wherein the flexibility agent is urea, citric acid or a polyol.

5. The composition of claim 1, wherein the binder is selected from the group consisting of stearic acid, glycerol monostearate, montmorillonite and any mixture thereof.

6. The composition of claim 1, having a melting point range of about 150 C to about 230 C.

7. A biodegradable foam pellet composition, the composition consisting of:
   a starch at about 30% to about 80% by weight of the composition,
   a plasticizer at about 2% to about 30% by weight of the composition;
   a flexibility agent at about 5% to about 40% by weight of the composition;
   a binder at about 1% to about 15% by weight of the composition;
   a defoaming agent at about 0.1% to about 5% by weight of the composition;
   a hydrophobic agent at about 0.1% to about 5% by weight of the composition, wherein the hydrophobic agent is a fat or an oil, the fat or the oil having an HLB in a range of about 9 to about 11;
   an emulsifier at about 0.1% to about 5% by weight of the composition; and
   optionally, a plant fiber at about 0.01% to about 10% by weight of the composition.

8. The composition of claim 7, wherein the starch is a starch powder selected from the group consisting of corn starch, wheat starch, potato starch, buckwheat starch and any mixture thereof.

9. The composition of claim 7, wherein the plasticizer is selected from the group consisting of glycerol, ethylene glycol, polyglycerol and any mixture thereof.

10. The composition of claim 7, wherein the flexibility agent is urea, citric acid or a polyol.

11. The composition of claim 7, wherein the binder is selected from the group consisting of stearic acid, glycerol monostearate, montmorillonite and any mixture thereof.

12. The composition of claim 7, wherein the defoaming agent is calcium carbonate.

13. The composition of claim 7, having a melting point range of about 130 C to about 180 C.

14. The composition of claim 1, wherein the plant fiber is selected from the group consisting of abaca, hemp, bamboo, banana, coir, cotton, jute, kenaf, sisal, straw, remine, bagasse, sugar cane, wood, cellulose, and combinations thereof.

15. The composition of claim 7, wherein the plant fiber is selected from the group consisting of, hemp, bamboo, banana, coir, cotton, jute, kenaf, sisal, straw, remine, bagasse, sugar cane, wood, cellulose, and combinations thereof.

* * * * *